A. C. LINDGREN.
SEED PLANTER.
APPLICATION FILED DEC. 29, 1910.
997,626.
Patented July 11, 1911.
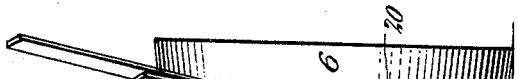

UNITED STATES PATENT OFFICE.

ALEXUS C. LINDGREN, OF MOLINE, ILLINOIS, ASSIGNOR TO MOLINE PLOW COMPANY, A CORPORATION OF ILLINOIS.

SEED-PLANTER.

997,626. Specification of Letters Patent. Patented July 11, 1911.

Original application filed June 8, 1908, Serial No. 437,276. Divided and this application filed December 29, 1910. Serial No. 599,929.

*To all whom it may concern:*

Be it known that I, ALEXUS C. LINDGREN, of Moline, county of Rock Island, and State of Illinois, have invented a new and useful Improvement in Seed-Planters, of which the following is a specification, being a division of an application filed by me June 8, 1908, Serial No. 437,276, patented August 30, 1910, No. 968,671.
This invention relates to seed planters for planting either corn or cotton seed, and has reference more particularly to that type of machine embodying a wheeled frame equipped with suitable furrow opening and covering devices and a seed dropping mechanism operated from the ground wheels.

The invention consists of various improvements in the form, construction and manner of mounting the furrow opening and covering devices for the seed, which improvements will be more fully described hereinafter and their novel features pointed out in the claims.

The invention consists also in its details of construction and combination of parts hereinafter described and claimed.

In the accompanying drawings: Figure 1 is a top plan view of my improved machine, certain parts being removed to expose other parts to view. Fig. 2 is a side elevation of the same. Fig. 3 is a rear elevation.

In the accompanying drawings I have represented my invention as applied to a machine in which fertilizer is deposited in a furrow and then covered, the seed deposited on the covered fertilizer and the seed finally covered with soil, but my invention is restricted mainly to the form and construction of the seed covering devices and the combination of such covering devices with means at the front of the machine for removing the surface soil, the other features of the machine, that is the opening and covering devices for the fertilizer, being claimed in an application fined by me August 1, 1910, Serial No. 574,897, said application being a division of original application filed June 8, 1908, Serial No. 437276, patented August 30, 1910 as No. 968,671, of which original application the present application is a division.

Referring to the drawings:—1 represents a rectangular frame consisting of two longitudinally extending side bars 2 and 3, connected at their rear ends by a cross-bar 4, having its ends secured to the side bars, the forward ends of which extend inwardly toward each other and have secured to them a draft bar 5.

The frame is sustained in the present instance by ground carrying wheels 6 and 7 and gives support to a fertilizer distributing device 8, and at its rear to a seed distributing mechanism 9, the arrangement being such that as the machine advances the fertilizer will be first deposited in the furrow and then the seed.

At its forward end the frame carries a sweep 10, in the form of a plate fixed to the forward face of a frog 11 and diverging outwardly and rearwardly therefrom. The frog is fixed to the lower end of a standard 12, which in turn is fixed at its upper end to the frame, and below the sweep the frog is extended downwardly to receive a furrow opening blade 13 which is fixed to the front of the frog. The fertilizer deposited by the distributer 8 is covered by a covering device 14, of such form that while covering the fertilizer, it will at the same time form a furrow over the covered fertilizer for the deposit of the seed, this device *per se* forming no part of the present application, but being claimed in the application above referred to, Serial No. 574,897, to which reference may be had for a more detailed description of said device than is here given.

The seed from the hopper 9 enters the upper end of a seed spout 15, in the rear of which and sustained by the frame is a seed covering device in the form of two shoes 16. These shoes are provided at their forward ends with upwardly extending ears 17, connected by means of a horizontal transverse pivot bolt 18 between the lower ends of two arms 19, extending upwardly and outwardly and jointed at their upper ends by means of two horizontal transverse pivot bolts 20, to downwardly extending ears 21, fixed to the rear cross-bar 4 before alluded to. The bottoms of these shoes are widened at the front, are concaved slightly at their under sides, and curved upwardly at their forward ends, and as they are drawn over the ground with a floating action, they will press the soil at the sides of the furrow inwardly, and will thereby effectually cover the deposited seed and pack the soil down thereon. The shoes are provided with boxes 22, in which sand or soil may be filled to give them the proper weight, lids 23 being provided to cover the boxes, which lids are held in place by nuts on the upper ends of vertical bolts extending upwardly through the boxes and through the lids.

In order that the soil thrown outwardly by the sweep 10 may be pushed inwardly within reach of the concave surfaces of the shoes, to the end that the latter will act to effectually cover the seed, I provide at the rear end of the frame, at opposite sides, deflecting blades 24, 24, in the form of vertical plates connected at their upper ends with the side bars of the frame and extending downwardly therefrom and curved inwardly toward each other so as to extend within the outer limits of the bottoms of the shoes, and also curved rearwardly. These deflecting blades will act, as the machine is advanced, to force the soil which is thrown outwardly by the sweep, inwardly toward the covering shoes and within the path of the same, so that the soil is thus caused to be smoothed over and packed down on the deposited seed. These blades are connected with the frame so that they may be adjusted vertically, which connection is conveniently effected by forming vertical slots in their upper ends to receive fastening bolts 24'.

While I have illustrated my invention in the embodiment I prefer to adopt, it will be understood that the invention is not limited to any particular form or construction of the parts, except in so far as such limitations are specified in the claims.

Having thus described my invention, what I claim is:—

1. In a machine of the type described, the combination of the frame, seed discharging mechanism sustained thereby, covering shoes for the deposited seed, and a flexible connection between the covering shoes and frame; whereby said shoes may have a free vertical movement bodily with reference to the frame.

2. In a machine of the type described, the combination of the frame, the seed discharging mechanism sustained thereby, and a covering device for the deposited seed, said covering device consisting of two shoes jointed at their forward ends to the frame to pivot freely on a horizontal transverse axis.

3. In a machine of the type described, the combination of the frame, a seed discharging mechanism sustained thereby, and a seed covering device comprising two shoes jointed at their forward ends to the frame on a horizontal transverse axis and having their under sides concaved.

4. In a machine of the type described, the combination of the frame, a seed discharging mechanism mounted thereon, a seed covering device in the form of two shoes widened at their forward ends and jointed to the frame on a horizontal transverse axis, said shoes having their widened portions concaved on the under side.

5. In a machine of the type described, the combination of the frame, a seed discharging mechanism mounted thereon, and a covering device comprising two shoes jointed to the frame and provided with boxes to receive a weighting material.

6. In a machine of the type described, the combination of a frame, a seed discharging mechanism mounted thereon, links pointed at their upper ends to the rear end of the frame on a horizontal transverse axis and extending downwardly and rearwardly, and a covering device comprising two shoes jointed at their forward ends to the rear end of said links on a horizontal transverse axis.

7. In a machine of the type described, the combination of the frame, a sweep at the front of the same acting to throw the surface soil outward, a seed discharging mechanism mounted on the frame, blades carried by the frame and acting to direct the surface soil inward, and a covering device sustained by the frame in position to push said surface soil inwardly on the deposited seed.

8. In a machine of the type described, the combination of the frame, a sweep mounted thereon to act on the surface soil and consisting of a plate having its ends extending rearwardly and outwardly, a seed discharging mechanism mounted on the frame, a seed covering device, and blades at the rear end of the frame having their lower ends extending inwardly within the path of the covering device; whereby said blades will act to push the surface soil inward within reach of the covering device.

In testimony whereof I hereunto set my hand this 21st day of December, 1910, in the presence of two attesting witnesses.

ALEXUS C. LINDGREN.

Witnesses:
T. C. BLANDING,
C. A. BANISTER.